United States Patent
Ujii et al.

(10) Patent No.: US 7,445,476 B2
(45) Date of Patent: Nov. 4, 2008

(54) CARD FOR INFORMATION EQUIPMENT, AND TERMINAL FOR INFORMATION EQUIPMENT

(75) Inventors: Junichi Ujii, Kanagawa (JP); Masato Nakashima, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/219,340

(22) Filed: Sep. 1, 2005

(65) Prior Publication Data

US 2006/0046544 A1 Mar. 2, 2006

(30) Foreign Application Priority Data

Sep. 2, 2004 (JP) ............... P.2004-255645
Sep. 2, 2004 (JP) ............... P.2004-255646
Sep. 2, 2004 (JP) ............... P.2004-255647

(51) Int. Cl.
*H01R 13/62* (2006.01)

(52) U.S. Cl. ............... 439/159; 439/945; 439/630

(58) Field of Classification Search ............... 439/159, 439/160, 630, 911, 945, 631
See application file for complete search history.

(56) References Cited

U.S. PATENT DOCUMENTS

| | | | | |
|---|---|---|---|---|
| 5,674,080 | A | * | 10/1997 | Takemura ............... 439/159 |
| 5,993,261 | A | * | 11/1999 | Klatt et al. ............... 439/630 |
| 6,132,223 | A | * | 10/2000 | Seeley et al. ............... 439/76.1 |
| 6,447,313 | B1 | * | 9/2002 | Zuin ............... 439/159 |
| 6,746,280 | B1 | * | 6/2004 | Lu et al. ............... 439/630 |
| 6,776,631 | B2 | * | 8/2004 | Shimada et al. ............ 439/159 |
| 6,974,338 | B1 | * | 12/2005 | Hasegawa ............... 439/159 |
| 7,094,106 | B2 | * | 8/2006 | Yamamoto et al. ......... 439/630 |
| 2004/0266238 | A1 | * | 12/2004 | Chou ............... 439/159 |

FOREIGN PATENT DOCUMENTS

JP 2002-298092 10/2002

* cited by examiner

*Primary Examiner*—Hien Vu
(74) *Attorney, Agent, or Firm*—Hogan & Hartson LLP

(57) ABSTRACT

A PC card has a card body portion in which a first card terminal portion is formed in one end and a second card terminal portion is formed in the other end. The card terminal portion has a chip slot. A SIM card inserted through an insertion port into the chip slot is electrically connected to a printed circuit board. The insertion port of the chip slot is opened in an outer side face of the second card terminal portion.

2 Claims, 12 Drawing Sheets

CARD FOR INFORMATION EQUIPMENT, AND TERMINAL FOR INFORMATION EQUIPMENT

CROSS-REFERENCE TO RELATED APPLICATIONS

This application is based upon and claims the benefit of priority from the prior Japanese Patent Applications No. 2004-255645 filed on Sep. 2, 2004, No. 2004-255646 filed on Sep. 2, 2004, and No. 2004-255647 filed on Sep. 2, 2004, the entire contents of which are incorporated herein by reference.

BACKGROUND OF THE INVENTION

1. Field of the Invention

The present invention relates to a terminal for information equipment such as a PC card or a USB communication terminal which is to be inserted into information equipment such as a portable computer or a PDA (Personal Digital Assistant), and particularly a technique for connecting and holding a chip card on which identifying information is recorded, such as a SIM (Subscriber Identity Module) card, a UIM (User Identity Module) card, or a USIM (Universal Subscriber Identity Module) card, on a PC card or a terminal for information equipment.

2. Description of the Related Art

Some of PC cards of this kind are used for expanding the function of information equipment (a portable computer, hereinafter often abbreviated to "PC") and causing the information equipment to serve as a transmitting and receiving terminal for radio communication. In the case where such a PC card is used by plural persons, the following counter measure is taken in order to manage the use of each subscriber. In a state where a SIM card on which personal data and identifying information such as a subscriber telephone number are recorded is inserted to a PC card, the PC card is inserted into a slot of a PC to be electrically connected thereto. The identifying information of the SIM card is transmitted via the PC card.

A PC card is configured in accordance with the standard of PCMCIA (Personal Computer Memory Card International Association). In the case of Type 2, for example, the size is specified to the width: 54 mm×the length: 86.5 mm×the thickness: 5 mm. When a SIM card having a thickness of about 0.8 mm is to be inserted to such a very thin PC card, various difficulties in design arise in viewpoints such as the installation space.

In the related art, therefore, a mechanism of only sliding and inserting a SIM card into a PC card is employed. When the SIM card is to be detached, an exposed portion of the SIM card must be nipped. Therefore, the operability is poor, and bending stress or the like is generated in the nipped portion, thereby causing a possibility that internal breakage occurs.

Recently, in order to solve the problems of the operability, the connection reliability, and the like, a PC card in which an ejecting mechanism is employed has been proposed. In the PC card, a middle portion of the PC card is cut away, and an ejecting mechanism which is attached to the cutaway portion causes a SIM card to be inserted and extracted in a direction perpendicular to the insertion direction of the PC card.

In a related PC card, when a SIM card is erroneously extracted during operation, there is a possibility that a circuit board of the PC card is broken. In a state where a PC card is inserted to a PC, therefore, the PC card must be protected so that an erroneous operation of extracting a SIM card does not occur.

By contrast, in the PC card having the ejecting mechanism, the cutaway portion for the ejecting mechanism is formed in the middle portion of the PC card, and hence the strength of the PC card itself is weakened. Even when the PC card is reinforced, the circuit board may be broken by twisting of the PC card or the like. Furthermore, the cutaway of the PC card and an insertion port of the ejecting mechanism cause the circuit board and the like of the SIM card or the PC card to be under the influence of electrical noises. There is a problem in that a countermeasure against noises generated by this configuration is not sufficiently provided even by a shield.

SUMMARY OF THE INVENTION

An object of the invention is to provide a card for information equipment and a terminal for information equipment in which the strength of the card itself can be held to prevent a circuit board or the like from being destroyed, and an erroneous operation of extracting a chip card in a state where the card or the terminal is inserted to information equipment can be prevented from occurring.

Another object of the invention is to provide a card for information equipment and a terminal for information equipment which is hardly affected by electrical noises caused inside information equipment.

The invention provides a card which is to be inserted into a card slot of an information equipment, having: a card terminal portion which is electrically connected to the information equipment in a state where the card is inserted into the card slot; and a chip slot which is provided for inserting a chip card into the card, wherein an insertion port of the chip slot is provided in a surface which is not facing to internal surfaces of the card slot, and the chip card is restricted to be ejected from the insertion port when the card is inserted into the card slot.

The invention is applied to a card for information equipment having a single plate-like shape or a card for information equipment with an extending portion.

The invention provides a card for information equipment, having: a card body portion which is to be inserted into a card slot of the information equipment; a card terminal portion which is electrically connected to the information equipment in a state where the card body portion is inserted into the card slot; and a chip slot which is provided for inserting a chip card into the card body portion, wherein an insertion port of the chip slot is placed in an insertion port of the card slot when the card body portion is inserted into the card slot, the card body portion has an operation portion which is provided for ejecting a chip card inserted into the chip slot, and the operation portion is placed so as to be covered by the card slot when the card body portion is inserted into the card slot.

The invention also provides a card for information equipment, having: a card body portion which is to be inserted into a card slot of the information equipment; a card terminal portion which is electrically connected to the information equipment in a state where the card body portion is inserted into the card slot; and a card extending portion which projects from the card slot in a state where the card body portion is inserted, wherein the card extending portion has a chip slot which is provided for inserting a chip card into the card body portion, an insertion port of the chip slot is placed on an outer side face which leads to an insertion port of the card slot when the card body portion is inserted into the card slot, the card body portion has an operation portion which is provided for ejecting a chip card inserted into the chip slot, and the operation portion is placed so as to be covered by the card slot when the card body portion is inserted into the card slot.

According to the cards for information equipment, the chip slot to which the chip card is to be inserted is disposed in the another end portion of the card body portion or the card extending portion, and the insertion port of the chip slot is placed in an end face of the another end portion of the card body portion or the outer side face of the card extending portion. Therefore, the chip card can be easily inserted. Further, although a cutaway portion is not disposed in the card body portion, the strength of the card itself can be held to prevent a circuit board or the like from being destroyed.

Furthermore, when the card for information equipment is inserted into the card slot of the information equipment, the operation portion for ejecting the chip card is covered by the card slot of the information equipment. Therefore, in an inserted state of the card for information equipment, an erroneous operation of extracting the chip card from the card for information equipment can be prevented from occurring.

The invention also provides a card for information equipment, having: a card body portion which is to be inserted into a card slot of the information equipment; a card terminal portion which is electrically connected to an equipment terminal portion in the information equipment in a state where the card body portion is inserted into the card slot; and a card extending portion which projects from the card slot in a state where the card body portion is inserted, wherein the card extending portion has a chip housing portion which houses a chip card, and a chip cover which exposes or covers the chip housing portion in accordance with selection of an open state or a close state, and the close state of the chip cover is not canceled in a state where the card body portion is inserted into the card slot, and the card terminal portion is not electrically connected to the equipment terminal portion in the open state of the chip cover.

According to the card for information equipment, a cutaway is not disposed in the card body portion, and the chip housing portion is disposed in the card extending portion, and exposed or covered by the chip cover. Therefore, the chip card is connected and held outside the information equipment, and can be excluded from the influence of electrical noises generated in the information equipment. Furthermore, the strength of the card itself can be held, and a circuit board and the like can be prevented from being broken.

Furthermore, the chip card housed in the card extending portion is inserted or extracted by opening or closing the chip cover. The chip cover is not opened in a state where the card body portion is inserted into the card slot of the information equipment. Therefore, in a state where the card is inserted to the information equipment, an erroneous operation of extracting the chip card can be prevented from occurring.

The invention is applied to a card type terminal such as a PC card, or a box type terminal such as a USB communication terminal.

The invention also provides a terminal for information equipment, having: a card body portion which is to be inserted into a card slot of the information equipment; a card terminal portion which is electrically connected to the information equipment in a state where the card body portion is inserted into the card slot; and a card extending portion which is provided on another end side of the card body so that the card extending portion projects from the card slot in a state where the card body portion is inserted, wherein the card extending portion has a chip slot which is provided for inserting a chip card into the card body portion, and an insertion port of the chip slot is placed on a surface thereof opposed to an insertion port of the card slot when the card body portion is inserted into the card slot.

The invention also provides a terminal for information equipment, having: a USB plug which is to be inserted into a USB slot of information equipment, and is electrically connected to the information equipment; and a terminal body portion which is provided on one end side of the USB plug so that the terminal body portion projects from the USB slot in a state where the USB plug is inserted, wherein the terminal body portion has a chip slot which is provided for inserting a chip card into the terminal body portion, and an insertion port of the chip slot is placed on a surface thereof opposed to an insertion port of the USB slot when the USB plug is inserted into the USB slot.

In the specification, the face of "circuit board" includes faces of connection terminals.

According to the terminal for information equipment, the chip slot is disposed in the card extending portion or the terminal body portion, and the chip card is inserted to the chip slot. Therefore, the chip card is connected and held outside the information equipment, and can be excluded from the influence of electrical noises generated in the information equipment.

Furthermore, an insertion port of the chip slot is placed in a side face which is opposed to the card slot of the information equipment. Therefore, in a state where the card for information equipment is inserted into the card slot of the information equipment, an erroneous operation of extracting the chip card from the card for information equipment can be prevented from occurring.

DETAILED DESCRIPTION OF THE PREFERRED EMBODIMENTS

First Embodiment

A first embodiment of the card for information equipment of the invention will be described with reference to FIGS. 1A, 1B, and 2.

Figure 1A:
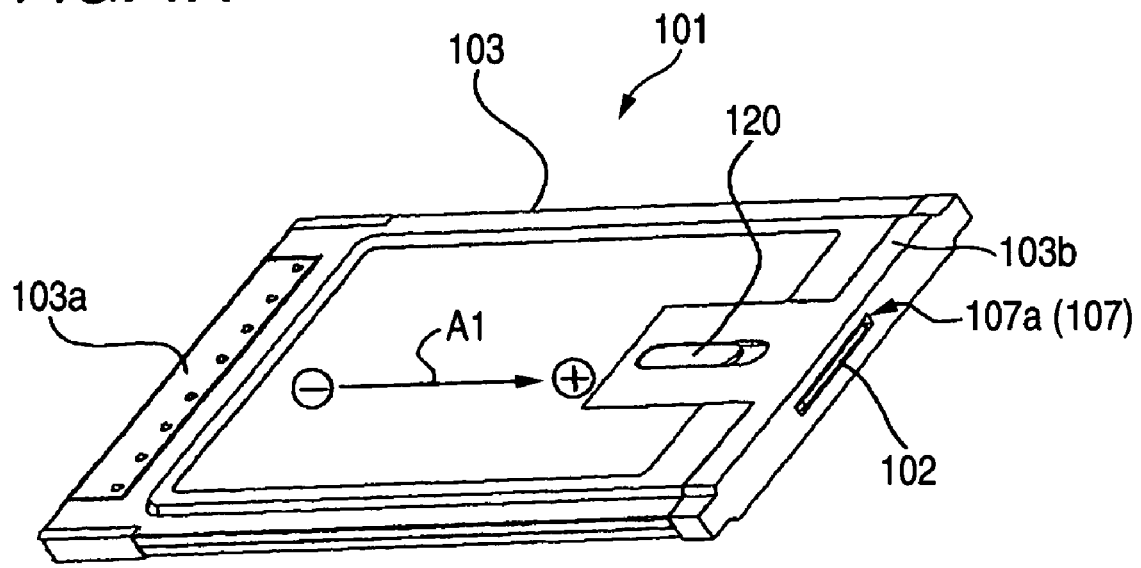
FIG. 1A is a perspective view schematically showing the configuration of a PC card of a first embodiment in a state where a SIM card is inserted.
Figure 1B:
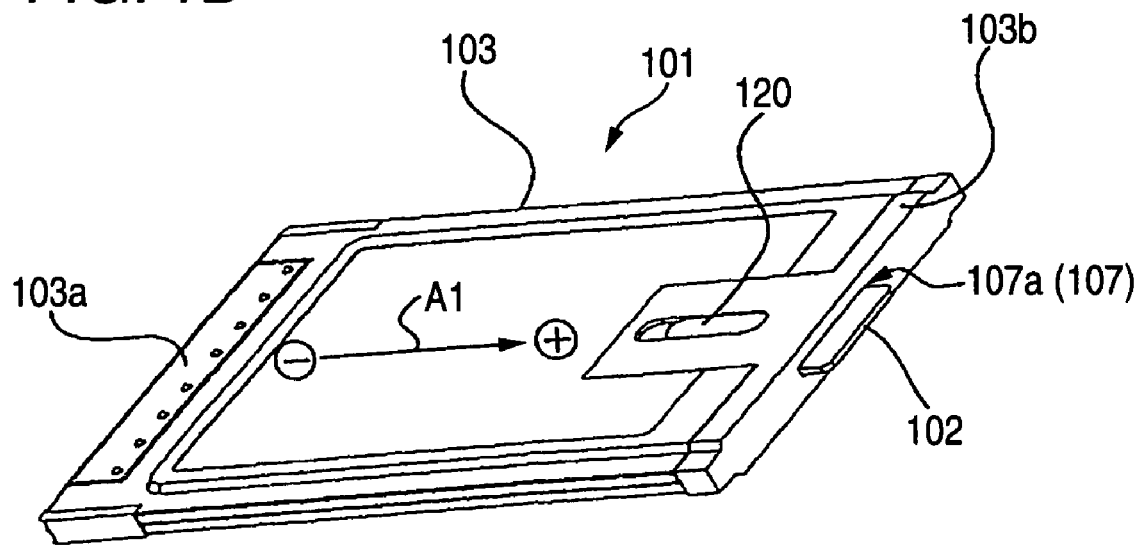
FIG. 1B is a perspective view showing the PC card in a state where the SIM card is ejected.
Figure 2:
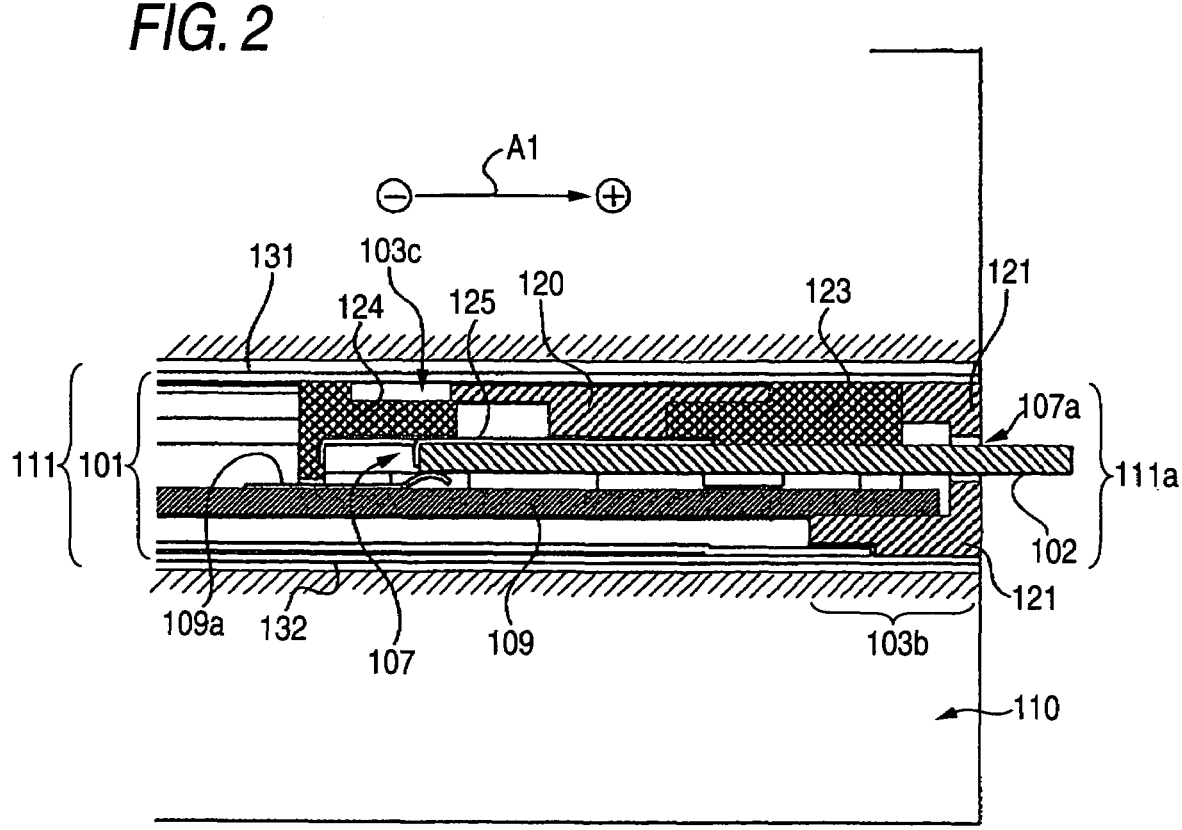
FIG. 2 is a section view showing the PC card of the first embodiment inserted to a PC, in a state where the SIM card is ejected.

FIG. 1A is a perspective view schematically showing the configuration of a PC card of the first embodiment in a state where a SIM card is inserted, FIG. 1B is a perspective view showing the PC card in a state where the SIM card is ejected, and FIG. 2 is a section view showing the PC card of the first embodiment inserted to a PC, in a state where the SIM card is ejected.

As shown in FIG. 1A, 1B, or 2, the PC card 101 of the first embodiment is a PC card having a single plate-like shape, and, in a state where the SIM card 102 is connected and held and the PC card is inserted into a PC slot 111 of a PC 110, is used for expanding the function of the PC 110, or causing the PC to function as a radio communication terminal. The SIM card 102 incorporates a circuit board (not shown) on which identifying information is recorded, and has a rectangular card-like shape in which connection terminals 102a are formed on the rear face.

As shown in FIGS. 1A and 1B, the PC card 101 of the first embodiment has a card body portion 103 in which a first card terminal portion 103a is formed in one end and a second card terminal portion 103b is formed in the other end.

The card body portion 103 has a thin rectangular case-like shape which is built into a resin-made frame in a state where upper and lower plate 131 and 132 that are thin metal plates overlap with each other, and incorporates a printed circuit board 109, etc. The term of "upper face" of the card body portion 103 means a face on the operation side of the PC 110 in the case where the PC card 101 is inserted into the PC slot 111, and the term of "lower face" of the card body portion 103 means a face on the installation side of the PC 110.

The first card terminal portion 103a for a PC card bus (32 bits) is formed in one end of the printed circuit board 109. The first card terminal portion 103a is exposed from the one end side (the insertion side of the PC card 101) of the card body portion 103, and to be electrically connected to a PC terminal portion (not shown) which is mounted in an inner part of the PC slot 111.

In the embodiment, as shown in FIG. 1A, 1B, or 2, a chip slot 107 is disposed inside the second card terminal portion 103b. In the chip slot 107, the SIM card 102 inserted through an insertion port 107a is inserted by a chip slider 125 to be placed above the printed circuit board 109, and, in this state, the connection terminals 102a of the SIM card 102 are electrically contacted to spring terminals 109a on the printed circuit board 109. Furthermore, an eject switch (operation portion) 120 is disposed in the card body portion 103. The eject switch 120 is used for ejecting the SIM card 102 through the insertion port 107a. Hereinafter, the configurations of the chip slot 107 and the eject switch 120 will be described specifically.

As shown in FIG. 2, the second card terminal portion 103b is configured by the upper and lower plate 131 and 132, and a gate portion 121 disposed between the plates. The insertion port 107a of the chip slot 107 is formed so as to be passed through the gate portion 121, and opened in an outer side face of the second card terminal portion 103b (an end face opposite to the first card terminal portion 103a). Front and rear stoppers 124 and 123 are juxtaposed on the lower face of the upper plate 131, with forming a predetermined gap in the anteroposterior direction (the direction to the first card terminal portion 103a and the second card terminal portion 103b). The chip slider 125 is disposed below the front and rear stoppers 124 and 123. The chip slider 125 is formed into a plate-like shape having an L-like section so as to just fit with a tip end portion of the SIM card 102 which is inserted through the insertion port 107a.

The chip slider 125 is placed so as to abut against the lower faces of the front and rear stoppers 124 and 123, and guided thereby to be reciprocally movable in the insertion direction A1– of the SIM card 102 or the extraction direction A1+.

By contrast, the eject switch 120 is fixed to the upper face of the chip slider 125. The eject switch 120 is a member having a substantially T-like section shape, and used for moving the chip slider 125. A switch recess portion 103c is formed in the upper plate 131. The switch recess portion 103c is configured so that an air gap portion sandwiched by the front and rear stoppers 124 and 123 houses the eject switch 120, and the upper face of the eject switch 120 does not protruded from the upper plate 131 or is placed at a position lower than the upper plate.

The eject switch 120 is reciprocally movable in the switch recess portion 103c in the insertion direction A1– of the SIM card 102 or the extraction direction A1+. The chip slider 125 is moved in conjunction with this movement.

In accordance with the insertion of the SIM card 102, the chip slider 125 is moved in the insertion direction A1– of the card, and is stopped when the eject switch 120 abuts against the front stopper 124. The position where the chip slider 125 is stopped is set so that a rear end portion of the SIM card 102 is not protruded from the insertion port 107a of the chip slot 107.

Next, the use manner or function of the PC card 101 of the embodiment will be described.

As shown in FIGS. 1A and 1B, when the SIM card 102 is to be inserted to the PC card 101, the card is inserted from the insertion port 107a of the second card terminal portion 103b, and then inserted into the chip slot 107. In this case, in accordance with the insertion of the SIM card 102, the chip slot 107 is moved in the insertion direction A1–, and, in conjunction with this, the eject switch 120 is moved in the insertion direction A1–. As shown in FIG. 2, when the PC card 101 is inserted into the PC slot 111 of the PC 110, the insertion port 107a of the chip slot 107 is placed so as to be exposed in an insertion port 111a of the PC slot 111, and the eject switch 120 is covered by the upper face of the PC slot 111.

As described above, in the embodiment, when the PC card 101 is inserted into the PC slot 111, the eject switch 120 for ejecting the SIM card 102 is covered by the PC slot 111. In the state where the PC card 101 is inserted, therefore, an erroneous operation of extracting the SIM card 102 from the PC card 101 is prevented from occurring.

In this point, particularly, the chip slider 125 is moved in conjunction with the eject switch 120. Therefore, the chip slider 125 is not moved in the extraction direction A1+ of the SIM card 102 unless the eject switch 120 is operated, and hence the extraction of the SIM card 102 in a state where the PC card 101 is inserted can be surely prevented from occurring. When the SIM card 102 is inserted to the chip slot 107, the rear end portion of the SIM card 102 is not protruded from the insertion port 107a of the chip slot 107. Therefore, the SIM card 102 can be prevented from being nipped away.

In the embodiment, the insertion port 107a of the chip slot 107 is placed in the end face of the second card terminal portion 103b. Therefore, the SIM card 102 can be easily inserted, and a cutaway portion is not disposed in the card body portion 103 so that the strength of the card itself can be held to prevent the circuit board or the like from being destroyed.

In the embodiment, in the state where the PC card 101 is inserted into the PC slot 111, the insertion port 107a of the chip slot 107 is exposed in the insertion port 111a of the PC slot 111. Consequently, it is possible to easily visually check whether the SIM card 102 is inserted into the chip slot 107 or not.

Second Embodiment

Next, a second embodiment of the card for information equipment of the invention will be described with reference to FIG. 3.

Figure 3:
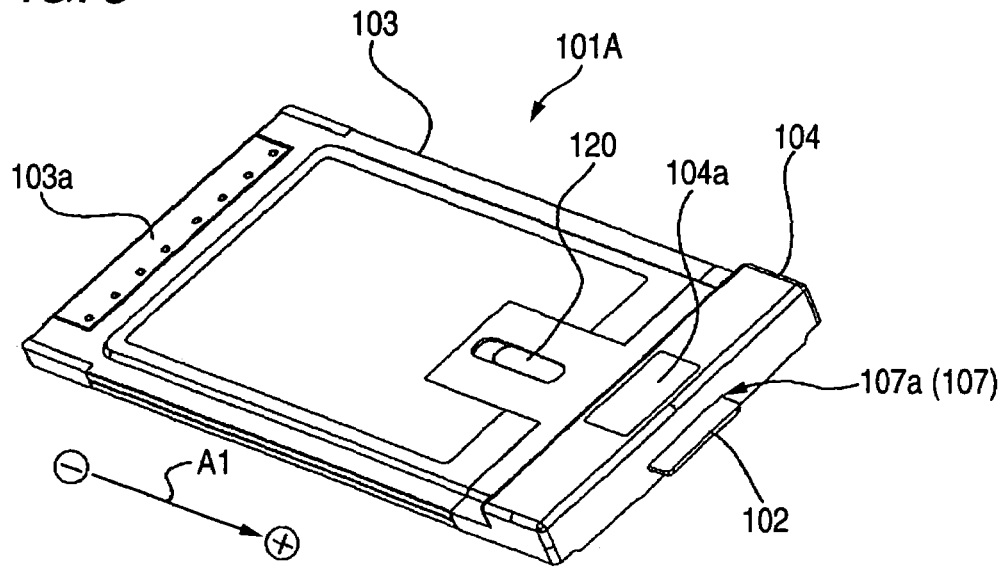
FIG. 3 is a perspective view schematically showing the configuration of a PC card of a second embodiment in a state where a SIM card is ejected.

FIG. 3 is a perspective view schematically showing the configuration of a PC card of the second embodiment in a state where a SIM card is ejected.

As shown in FIG. 3, the PC card 101A of the second embodiment is a PC card with an extending portion consisting of the card body portion 103 and a card extending portion 104, and is different mainly from the first embodiment in that the chip slot 107 is disposed in the card extending portion 104. Hereinafter, this point will be described in detail, and, with the other configuration, the same reference numerals as those of the first embodiment are used and their description is omitted.

The card extending portion 104 is a thick case member which extends from the other end of the card body portion 103 in the longitudinal direction (the extracting direction of the SIM card 102) A+, and incorporates the printed circuit board 109 extending from the card body portion 103, and an internal antenna (not shown). The thus configured card extending portion 104 is placed so as to be protruded from the insertion port of the PC slot 111 in the state where the card body portion 103 is inserted into the PC slot 111.

In the embodiment, the chip slot 107 is disposed inside the card extending portion 104, and extends in the insertion direction A1− of the SIM card 102 to reach the card body portion 103. The chip slider 125 is disposed inside the card body portion 103, and the eject switch 120 is fixed to the chip slider.

The insertion port 107a of the chip slot 107 is opened in an outer side face of the card extending portion 104 (a side face opposite to the first card terminal portion 103a), and, when the card body portion 103 is inserted into the PC slot 111, placed at a position which leads to the insertion port of the PC slot 111 in the end face of the PC 110 (see FIG. 2).

In the embodiment, a check plate 104a is fitted into the upper face of the card extending portion 104. The check plate 104a is formed so as to be transparent or translucent, and placed above the chip slot 107. When the SIM card 102 is inserted to the chip slot 107, the SIM card 102 can be visible through the card extending portion.

As described above, in the embodiment, the transparent or translucent check plate 104a is disposed in the card extending portion 104 to make the SIM card 102 visible through the card extending portion. Therefore, it is possible to easily know whether the SIM card 102 is inserted into the chip slot 107 or not.

In the embodiment, the insertion port 107a of the chip slot 107 in the end face of the card extending portion 104 is placed at the position which leads to the insertion port 111a of the PC slot 111 in the end face of the PC 110. Therefore, the SIM card 102 can be mounted at a height in the vicinity of the printed circuit board 109 of the card body portion 103, and hence the thickness of the connection terminals of the printed circuit board 109 can be reduced. In accordance with this, also the thickness of the card extending portion 104 can be reduced.

The other configuration and effects of the PC card 101A are identical with those of the first embodiment.

Third Embodiment

Next, a third embodiment of the card for information equipment of the invention will be described with reference to FIGS. 4A to 6B.

Figure 4A:
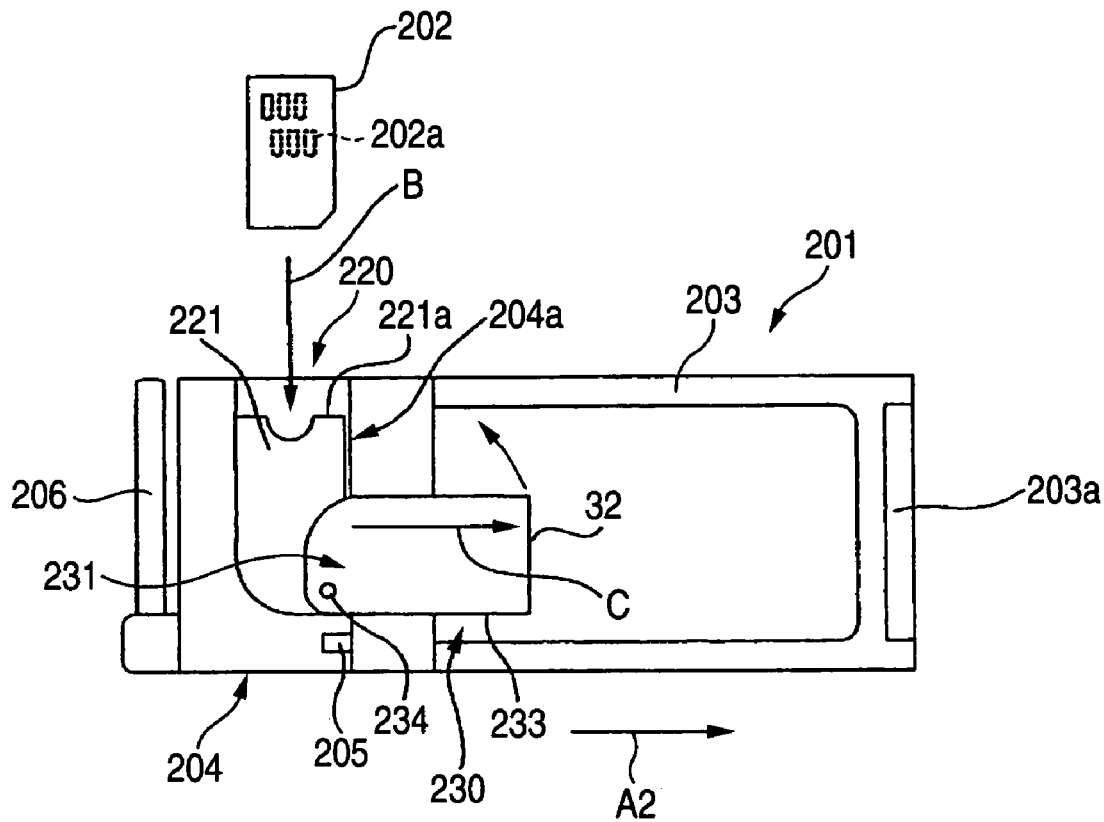
FIG. 4A is a plan view schematically showing the configuration of a PC card (in a state where a chip cover is opened) of a third embodiment.
Figure 4B:
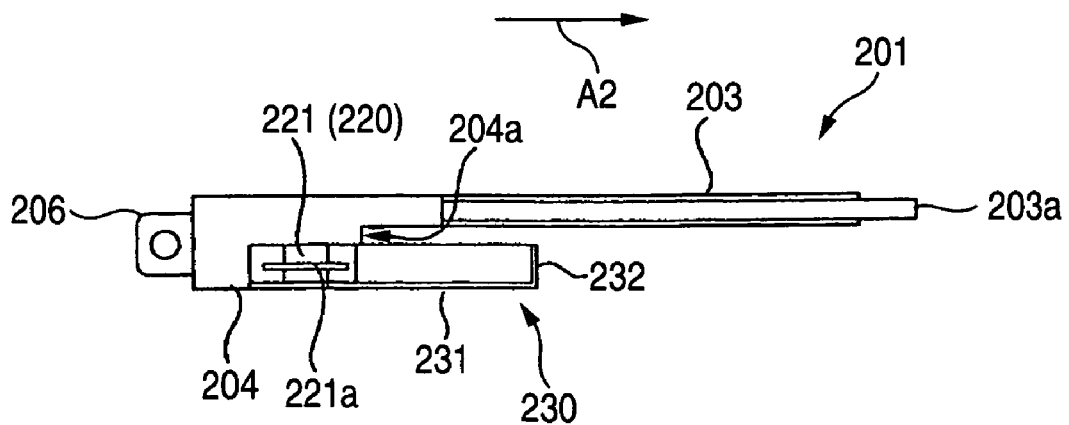
FIG. 4B is a rear view of the PC card.
Figure 5A:
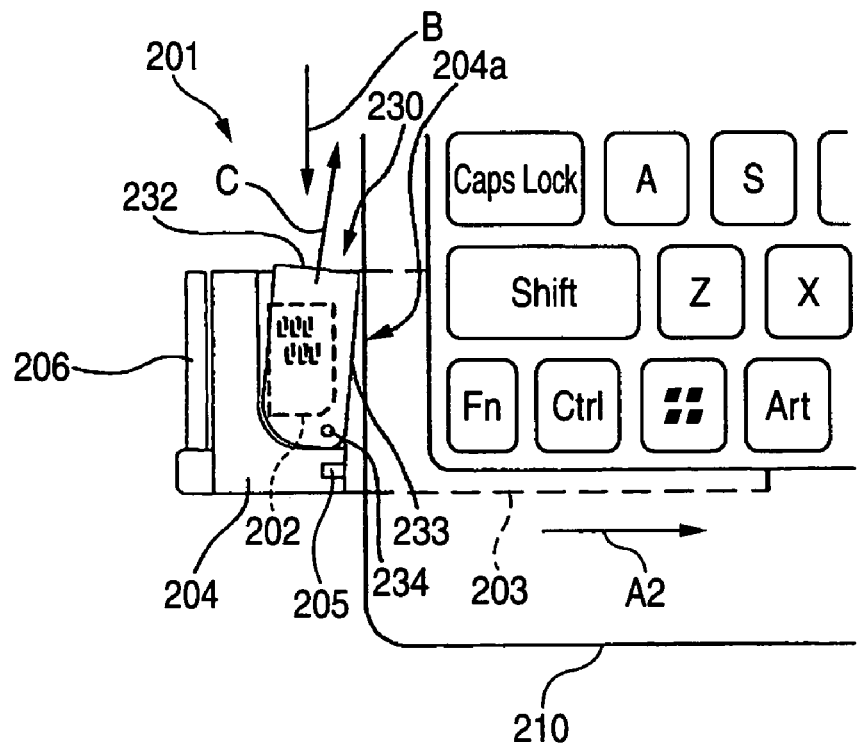
FIG. 5A is a plan view showing a state where the PC card of the third embodiment is inserted to a PC (in a state where the chip cover is substantially closed)
Figure 5B:
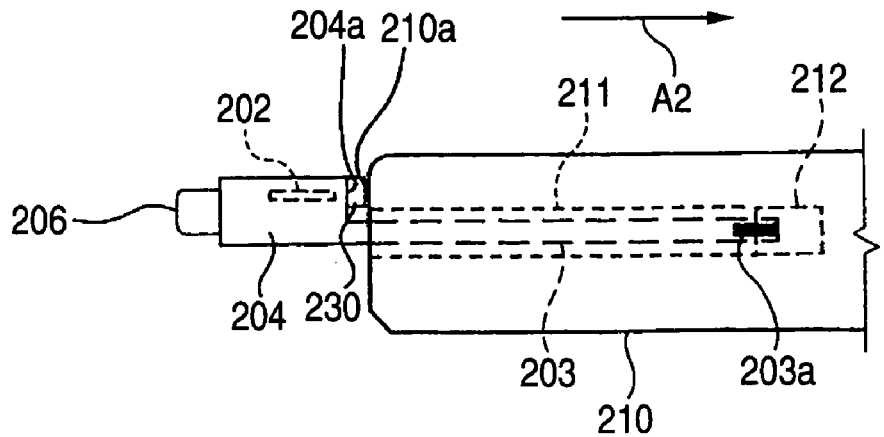
FIG. 5B is a front view of the PC card and the PC.
Figure 6A:
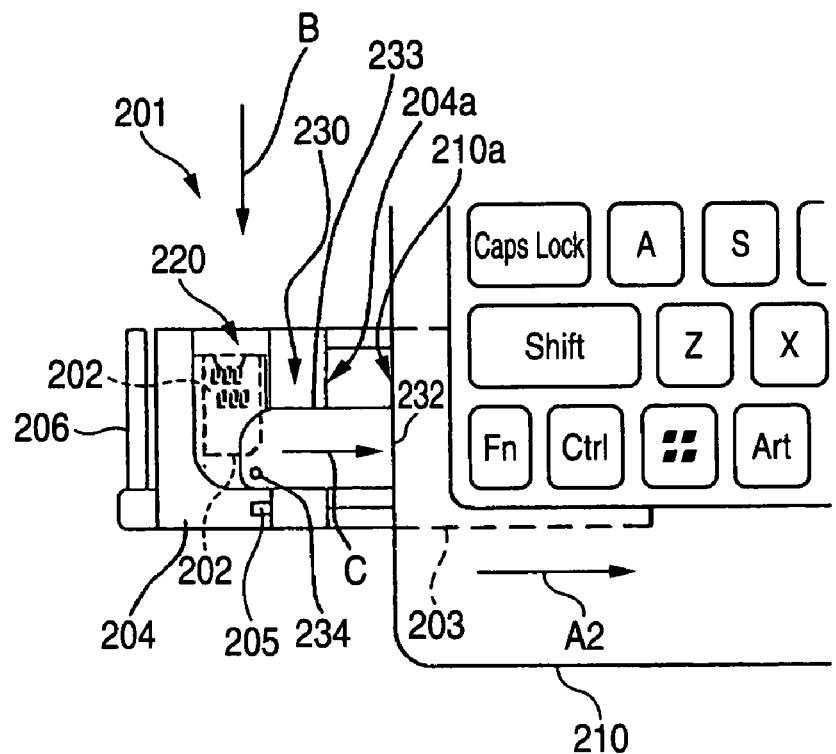
FIG. 6A is a plan view showing a state where the PC card of the third embodiment is inserted to the PC (in a state where the chip cover is opened)
Figure 6B:
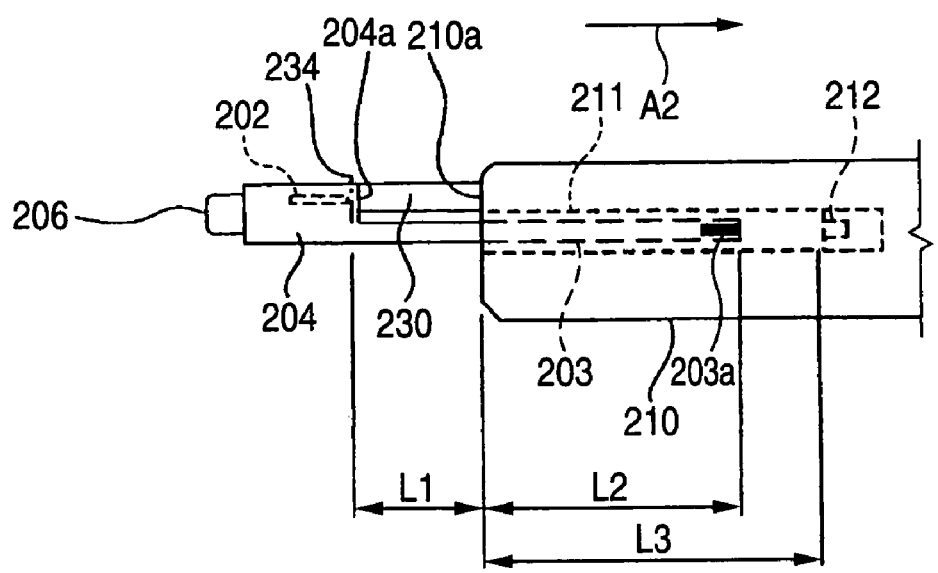
FIG. 6B is a front view of the PC card and the PC.

FIG. 4A is a plan view schematically showing the configuration of a PC card (in a state where a chip cover is opened) of the third embodiment, FIG. 4B is a rear view of the PC card, FIG. 5A is a plan view showing a state where the PC card of the third embodiment is inserted to a PC (in a state where the chip cover is substantially closed), FIG. 5B is a front view of the PC card and the PC, FIG. 6A is a plan view showing a state where the PC card of the third embodiment is inserted to the PC (in a state where the chip cover is opened), and FIG. 6B is a front view of the PC card and the PC.

As shown in FIG. 4A, 4B, 5A, or 5B, the PC card 201 of the third embodiment is, in a state where a SIM card 202 is connected and held and inserted into a PC slot 211 of a PC 210, used for expanding the function of the PC 210, or causing the PC to function as a radio communication terminal. The SIM card 202 incorporates a circuit board (not shown) on which identifying information is recorded, and has a rectangular card-like shape in which connection terminals 202a are formed on the rear face. Hereinafter, the configuration of PC card 201 will be specifically described.

As shown in FIGS. 4A and 4B, the PC card 201 has a card body portion 203 and a card extending portion 204.

The card body portion 203 has a thin rectangular case-like shape in which thin metal plates are built into a resin-made frame with overlapping with each other, and incorporates a printed circuit board (not shown), etc. A card terminal portion 203a for a PC card bus (32 bits) is formed in one end of the printed circuit board. The card terminal portion 203a is exposed from the one end side (the insertion side of the PC card) of the card body portion, and to be electrically connected to a PC terminal portion 212 which is mounted in an inner part of the PC slot 211.

The card extending portion 204 is a thick case member which extends from the other end of the card body portion 203 in the longitudinal direction (the extracting direction) A, and which is placed so as to be protruded from the PC slot 211 in the state where the card body portion 203 is inserted into the PC slot 211 (hereinafter, often referred to as "slot inserted state") (see FIGS. 5A and 5B). In the slot inserted state, the card extending portion 204 is placed with forming a gap that is as small as a degree at which a finger of the operator cannot be inserted, with respect to a side face 210a of the PC 210

(substantially identical with the end face 211a of the PC slot 211). A face which is to be opposed to the end face 210a of the PC 210 is set as "reference opposing face" 204a. An indicator 205 which indicates ON/OFF of a communication state, an external antenna 206 which can be housed by rotation, and the like are mounted in the card extending portion 204.

In the embodiment, a chip housing portion 220 and a chip cover 230 are disposed in the card extending portion 204.

The chip housing portion 220 houses the SIM card 202 to cause the card to be electrically connected to the printed circuit board, and is configured by disposing a card case portion 221 to house the SIM card 202, in a recess portion which can be closed by the chip cover 230. The card case portion 221 is placed so that the longitudinal direction B of the housed SIM card 202 is perpendicular to the longitudinal direction A2 of the PC card 201. An insertion port 221a of the card case portion 221 is opened on the side of one side face of the PC card 201 (hereinafter, the side is referred to as "insertion port side").

Spring terminals (not shown) which are electrically connected to the printed circuit board are mounted on the upper face of a bottom portion of the card case portion 221. The spring terminals are electrically connected to the connection terminals 202a of the SIM card 202, respectively, and urge the SIM card 202 to press it against the lower face of an upper portion of the card case portion 221. In order to recognize whether the SIM card 202 is housed or not, the card case portion 221 is formed so as to be transparent or translucent.

The chip cover 230 is selected to be in the open state or in the close state to expose or cover the chip housing portion 220. In order to prevent the SIM card 202 from being extracted, the chip cover causes the close state not to be cancelled in the slot inserted state, and, in order to prevent the SIM card 202 from being erroneously inserted, the card terminal portion 203a not to be electrically connected to the PC terminal portion 212 in the open state. The chip cover 230 will be specifically described.

The chip cover 230 is formed into a case-like shape which, in the close state, fills an air gap portion that is deficiently formed by the chip housing portion 220 in the outer shape of the card extending portion 204. The chip cover has an upper portion 231 which is flush with the upper face of the card extending portion 204; a first wall portion (other side portion) 232 which is formed as a wall face on the side of the insertion port; and a second wall portion (one side portion) 233 which is formed as a wall face on the side of the reference opposing face 204a. The ceiling face portion 231, the first wall portion 232, and the second wall portion 233 are placed so as to be perpendicular to one another. In order to recognize whether the SIM card 202 is inserted to the card case portion 221 or not, the chip cover 230 is formed to be transparent or translucent.

The chip cover 230 is supported so as to be slidably rotatable about a fulcrum 234, and configured so as to be selectively horizontally moved between the open state where the longitudinal direction C of the chip cover 230 is parallel to the longitudinal direction A2 of the card body portion 203, and the close state where the longitudinal direction C of the chip cover 230 is parallel to the longitudinal direction B of the chip housing portion 220.

As shown in FIGS. 5A and 5B, in the slot inserted state of the card body portion 203 and the close state of the chip cover 230, the chip cover 230 is placed at a position where the second wall portion 233 is flush with the reference opposing face and in the vicinity of the end face 210a of the PC 210. The second wall portion 233 abuts against the end face 210a of the PC 210 to block the slidable rotation, and stops the first wall portion 232 at the cover position of the insertion port 221a to prevent the close state from being cancelled.

As shown in FIGS. 6A and 6B, in the open state of the chip cover 230, the chip cover 230 is placed at a position where the first wall portion 232 is separated from the reference opposing face 204a and protruded toward the card terminal portion 203a. The first wall portion 232 abuts against the end face 210a of the PC 210 to block the insertion the PC card 201, and causes the card terminal portion 203a not to reach the PC terminal portion 212, thereby preventing the terminal portions from being electrically connected to each other.

Specifically, the chip cover 230 is set so that the distance L1 from the fulcrum 234 to the first wall portion 232 causes the distance L2 from the abutting position of the end face 210a of the PC 210 to the card terminal portion 203a to be shorter than the distance L3 from the abutting position of the end face 210a of the PC 210 to the PC terminal portion 212.

As described above, in the embodiment, a cutaway is not disposed in the card body portion 203, and the chip housing portion 220 is disposed in the card extending portion 204, and exposed or covered by the chip cover 230. Therefore, the SIM card 202 is connected and held outside the PC 210, and can be excluded from the influence of electrical noises generated in the PC 210. Furthermore, the strength of the card itself can be held, and a circuit board and the like can be prevented from being broken.

In the embodiment, furthermore, in the state where the card body portion 203 is inserted into the PC slot 211, the chip cover is not opened. In the state where the card is inserted to the PC 210, therefore, an erroneous operation of extracting the SIM card 202 can be prevented from occurring.

In the embodiment, moreover, in the state where the chip cover 230 is opened, the card terminal portion 203a is not to be electrically connected to the PC terminal portion 212 even when the PC card 201 is inserted into the PC slot 211. Therefore, the power source is not supplied from the PC 210 to the PC card 201 and the printed circuit board of the PC card 201 is not operated. In this state, consequently, the SIM card 202 can be safely inserted or extracted.

In the embodiment, moreover, the card case portion 221 of the chip housing portion 220, and the chip cover 230 are made transparent or translucent. Even in the state where the PC card 201 is inserted to the PC 210, therefore, it is possible to know whether the SIM card 202 is inserted to the PC card 201 or not.

Fourth Embodiment

Next, a fourth embodiment of the card for information equipment of the invention will be described with reference to FIGS. 7A to 7C and FIGS. 8A and 8B.

Figure 7A:
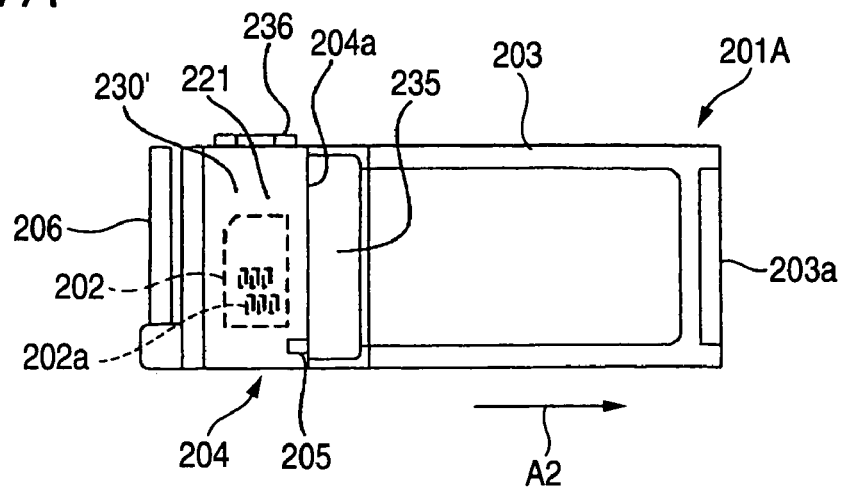
FIG. 7A is a plan view schematically showing the configuration of a PC card (in a state where a chip cover is closed) of a fourth embodiment.
Figure 7B:
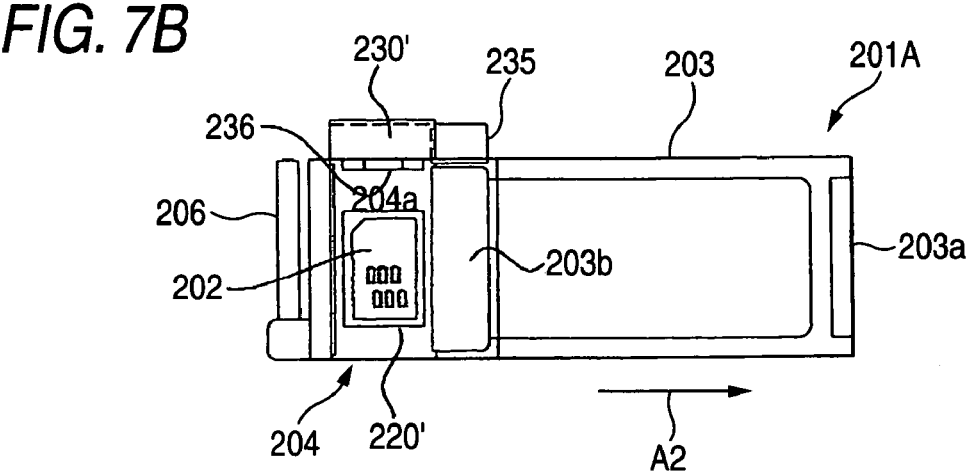
FIG. 7B is a plan view of the PC card (in a state where the chip cover is opened)
Figure 7C:
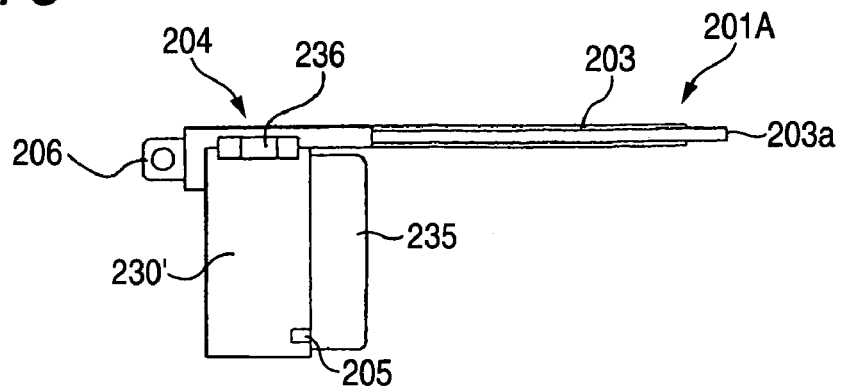
FIG. 7C is a rear view of the PC card (in a state where the chip cover is opened)

FIG. 7A is a plan view schematically showing the configuration of a PC card (in a state where a chip cover is closed) of the fourth embodiment, FIG. 7B is a plan view of the PC card (in a state where the chip cover is opened), and FIG. 7C is a rear view of the PC card (in a state where the chip cover is opened).

Figure 8A:
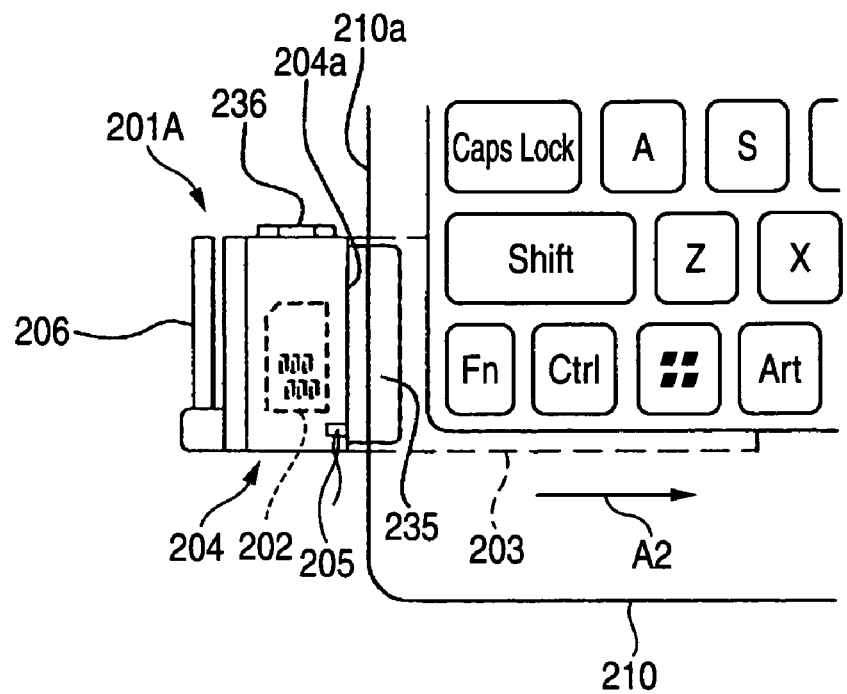
FIG. 8A is a plan view showing a state where the PC card of the fourth embodiment is inserted to a PC (in a state where a chip cover is closed)
Figure 8B:
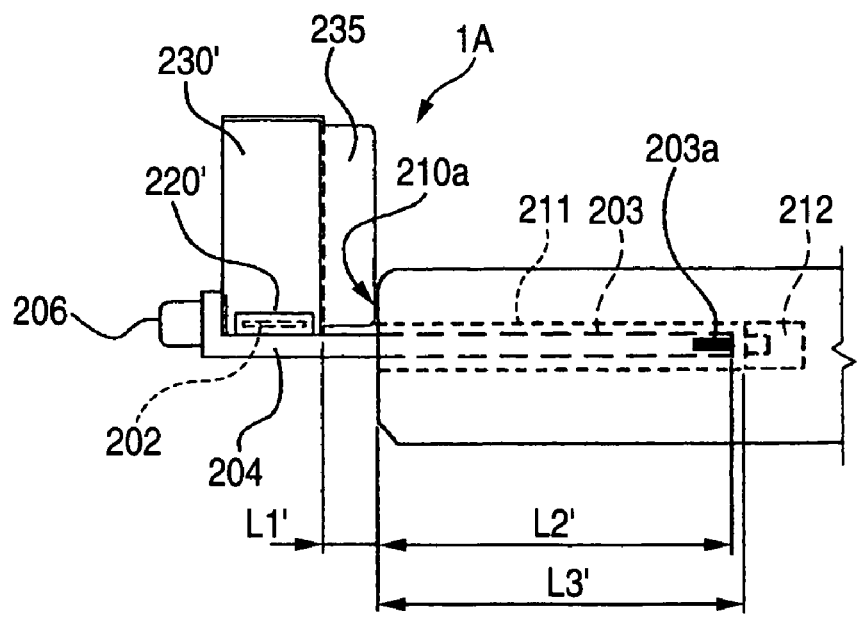
FIG. 8B is a front view of the PC card (in a state where the chip cover is opened) and the PC.

FIG. 8A is a plan view showing a state where the PC card of the fourth embodiment is inserted to a PC (in a state where a chip cover is closed), and FIG. 8B is a front view of the PC card (in a state where the chip cover is opened) and the PC.

As shown in FIGS. 7A to 7C or FIGS. 8A and 8B, the PC card 201A of the fourth embodiment is different mainly from the third embodiment in the configurations of a chip cover 230' and a chip housing portion 220'. Hereinafter, these points will be described, and, with the other configuration, the same reference numerals as those of the third embodiment are used and their description is omitted.

As shown in FIGS. 7A to 7C, a support shaft 236 for the chip cover is disposed in one side edge portion of the card extending portion 204 so as to be parallel to the longitudinal direction A2 of the card body portion 203. The chip cover 230' is rotatably supported by the support shaft 236, and can be opened and closed on the side of the card extending portion 204 opposite to the support shaft 236. A flange portion 235 which extends toward the card terminal portion 203a is formed into a flat plate-like shape in the lower edge of the reference opposing face 204a of the card extending portion 204. In the upper face of the card body portion 203, a recess 203b into which the flange portion 235 is just fit is formed in a region from a position in the vicinity of the card extending portion 204 to a position which is to be covered by the PC slot 211 in the slot inserted state.

As shown in FIG. 8A, in a close state of the chip cover 230', the flange portion 235 is fit into the recess 203b and placed in the same plane as the card body portion 203. The flange portion 235 is inserted together with the card body portion 203 into the PC slot 211, so that, in the slot inserted state, the chip cover 230' is not opened.

By contrast, as shown in FIG. 8B, in an open state of the chip cover 230', the flange portion 235 is placed at a position separated from the card body portion 203. A side edge (the right end edge in FIG. 8B) of the flange portion 235 abuts against the end face 210a of the PC 210 to block the insertion of the card body portion 203, and the card terminal portion 203a does not reach the PC terminal portion 212, thereby preventing the terminal portions from being electrically connected to each other.

Specifically, the chip cover 230' is set so that the elongating distance L1' of the flange portion 235 causes the distance L2' from the abutting position of the end face 210a of the PC 210 to the card terminal portion 203a to be shorter than the distance L3' from the abutting position of the end face 210a of the PC 210 to the PC terminal portion 212.

In the chip housing portion 220', as shown in FIG. 7B, the recess which is to house the SIM card 202 is exposed, and a spring terminal portion (not shown) is mounted on a bottom area of the recess. In the close state of the chip cover 230', the chip housing portion 220' presses the SIM card 202 against the rear face of the chip cover 230' by the elastic force of the spring terminal portion.

In the embodiment, the flange portion 235 is inserted over the whole area of the PC slot 211. Therefore, the close state can be held more strongly than the case of the third embodiment, and the chip cover 230' exposes thoroughly the chip housing portion 220'. Consequently, the embodiment is more advantageous than the third embodiment because the SIM card 202 can be easily inserted.

The other configuration and effects of the PC card 201A are identical with those of the third embodiment.

Fifth Embodiment

Next, a fifth embodiment of the card for information equipment of the invention will be described with reference to FIGS. 9A to 9C and FIGS. 10A and 10B.

Figure 9A:
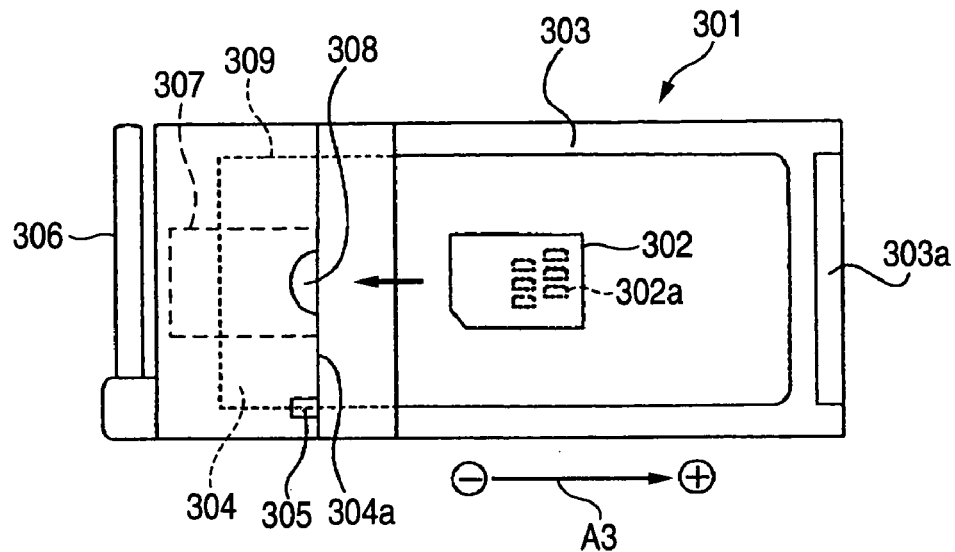
FIG. 9A is a plan view schematically showing the configuration of a PC card of a fifth embodiment.
Figure 9B:
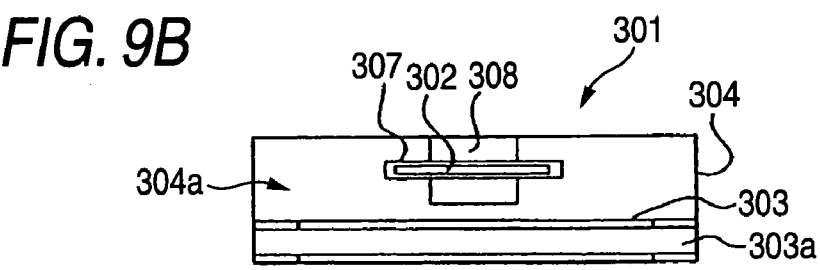
FIG. 9B is a right side view of the PC card.
Figure 9C:
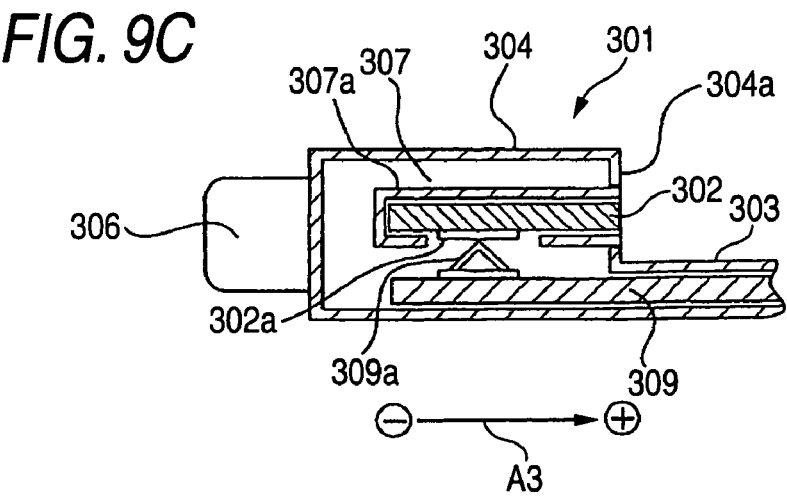
FIG. 9C is a front section view of the PC card.

FIG. 9A is a plan view schematically showing the configuration of a PC card of the fifth embodiment, FIG. 9B is a right side view of the PC card, and FIG. 9C is a front section view of the PC card.

Figure 10A:
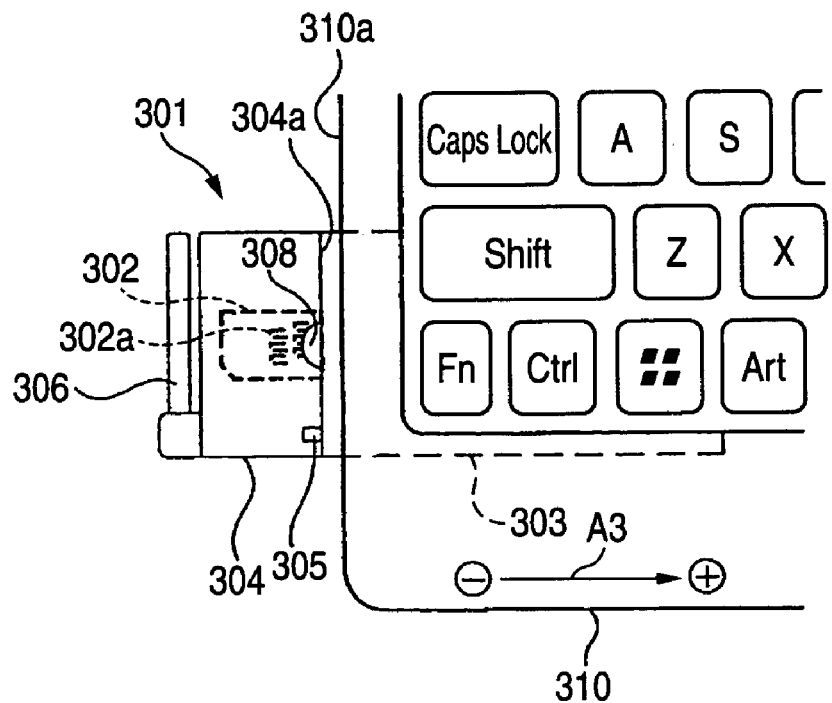
FIG. 10A is a plan view showing a state where the PC card of the fifth embodiment is inserted to a PC.
Figure 10B:
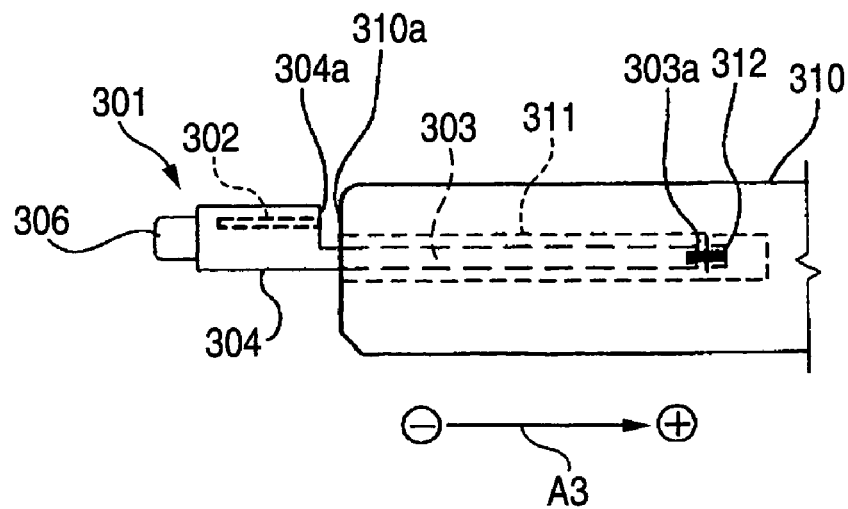
FIG. 10B is a front view of the PC card and the PC.

FIG. 10A is a plan view showing a state where the PC card of the fifth embodiment is inserted to a PC, and FIG. 10B is a front view of the PC card and the PC.

As shown in FIGS. 9A to 9C or FIGS. 10A and 10B, the PC card 301 of the fifth embodiment is a card type communication terminal, and, in a state where a SIM card 302 is connected and held and the PC card is inserted into a PC slot 311 of the PC 310, is used for expanding the function of the PC 310, or causing the PC to function as a radio communication terminal. The SIM card 302 incorporates a circuit board (not shown) on which identifying information is recorded, and has a rectangular card-like shape in which connection terminals 302a are formed on the rear face. Hereinafter, the configuration of PC card 301 will be specifically described.

As shown in FIGS. 9A to 9C, the PC card 301 has a card body portion 303 and a card extending portion 304.

The card body portion 303 has a thin rectangular case-like shape in which thin metal plates are built into a resin-made frame with overlapping with each other, and incorporates a printed circuit board 309, etc. A card terminal portion 303a for a PC card bus (32 bits) is formed in one end of the printed circuit board 309. The card terminal portion 303a is exposed from the one end side (the insertion side of the PC card) of the card body portion, and to be electrically connected to a PC terminal portion 312 which is mounted in an inner part of the PC slot 311 (see FIG. 10B).

The card extending portion 304 is a thick case member which extends from the other end of the card body portion 303 in the longitudinal direction (the extracting direction of the PC card) A−, and incorporates another end portion of the printed circuit board 309 extending from the card body portion 303, and an internal antenna (not shown). The card extending portion 304 is placed so as to be protruded from the insertion port of the PC slot 311 in a state where the card body portion 303 is inserted into the PC slot 311 (see FIGS. 10A and 10B). In the inserted state, the card extending portion 304 is placed with forming a gap that is as small as a degree at which a finger of the operator cannot be inserted, with respect to a side face 310a of the PC 310 (substantially identical with the end face of the PC slot 311). Among side faces of the card extending portion 304, a face which is to be opposed to the side face 310a of the PC 310 is set as "reference opposing face" 304a.

An indicator 305 which indicates ON/OFF of a communication state, an external antenna 306 which can be housed by rotation, and the like are mounted in the card extending portion 304.

In the embodiment, a chip slot 307 into which the inserted SIM card 302 is inserted is disposed inside the card extending portion 304. The chip slot 307 has a thin case-like chip case portion 307a in which one end is opened. The chip case portion 307a is placed above the printed circuit board 309 and parallel thereto so that the insertion port is on the reference opposing face 304a. In the chip case portion 307a, the connecting terminals 302a of the SIM card 302 are exposed from the lower face, and electrically connected to spring terminals 309a on the printed circuit board 309.

In accordance with the insertion or extraction of the SIM card 302, the thus configured chip case portion 307a is reciprocally moved in the insertion direction A3− of the SIM card 302 or the extraction direction A3+. The chip slot 307 is configured so that the chip case portion 307a is moved in the insertion direction A3− in accordance with the insertion of the SIM card 302, and engaged inside the card extending portion 304, thereby placing a rear end edge portion (a portion on the side of the insertion port) of the SIM card 302 on or inside the reference opposing face 304a. Furthermore, the chip slot 307 is configured so that the engagement is canceled by pressing down an insertion port portion of the chip case portion 307a, and the chip case portion 307a is moved in the extraction direction A3+ of the SIM card 302, thereby exposing the rear end edge portion of the SIM card 302.

In order to improve the insertion of the SIM card 302, a cutaway portion 308 is formed in the card extending portion 304. The cutaway portion 308 is recessed from the reference opposing face 304a in the insertion direction A3− of the SIM card 302, in a concave curved shape conforming to an external shape of a finger, and overlaps with a mouth portion of the chip slot 307, so that a rear end portion of the SIM card 302 inserted to the chip slot 307 is exposed.

Next, the use manner or function of the PC card 301 of the embodiment will be described.

As shown in FIGS. 10A and 10B, when the SIM card 302 is inserted to the chip slot 307 of the card extending portion 304, and the PC card 301 is inserted into the PC slot 311, the card terminal portion 303a is electrically connected to the PC terminal portion 312. Therefore, the PC 310 supplies the power source to the PC card 301, and a radio communication enabled state is established.

Under such circumstances, the reference opposing face 304a of the card extending portion 304 is placed with forming a gap that is as small as a degree at which a finger cannot be inserted, with respect to the side face 310a of the PC 310 on the end face the PC slot 311. Since the insertion port of the chip slot 307 is on the reference opposing face 304a, the operator cannot extract the SIM card 302 inserted into the chip slot 307 while the PC 310 conducts radio communication.

As described above, in the embodiment, the chip slot 307 is disposed in the card extending portion 304, and the SIM card 302 is inserted to the chip slot. Therefore, the SIM card 302 is connected and held outside the PC 310, and can be excluded from the influence of electrical noises generated in the PC 310.

In the embodiment, the SIM card 302 is inserted and extracted by the reciprocal movement of the chip case portion 307a in the card extending portion 304. Therefore, a cutaway portion is not required to be disposed in the card body portion, and hence the strength of the card itself can be held to prevent a circuit board or the like from being destroyed.

In this point, particularly, the cutaway portion 308 is disposed in the reference opposing face 304a (the mouth of the chip slot 307) of the card extending portion 304, and the rear end portion of the inserted SIM card 302 is exposed. When the SIM card 302 is to be inserted or extracted, the SIM card 302 can be handled without producing excessive stress in the card. The cutaway portion 308 has an advantage that, in the state where the PC card 301 is inserted, it is possible to know whether the SIM card 302 is inserted or not.

In the embodiment, the insertion port of the chip slot 307 is placed at the position close to the side face of the PC 310 so as be opposed thereto. Therefore, an erroneous operation of extracting the SIM card 302 from the PC card 301 in a state where the PC card 301 is inserted to the PC 310 can be prevented from occurring.

Sixth Embodiment

Next, a sixth embodiment of the card for information equipment of the invention will be described with reference to FIGS. 11A, 11B, 12A, and 12B.

Figure 11A:
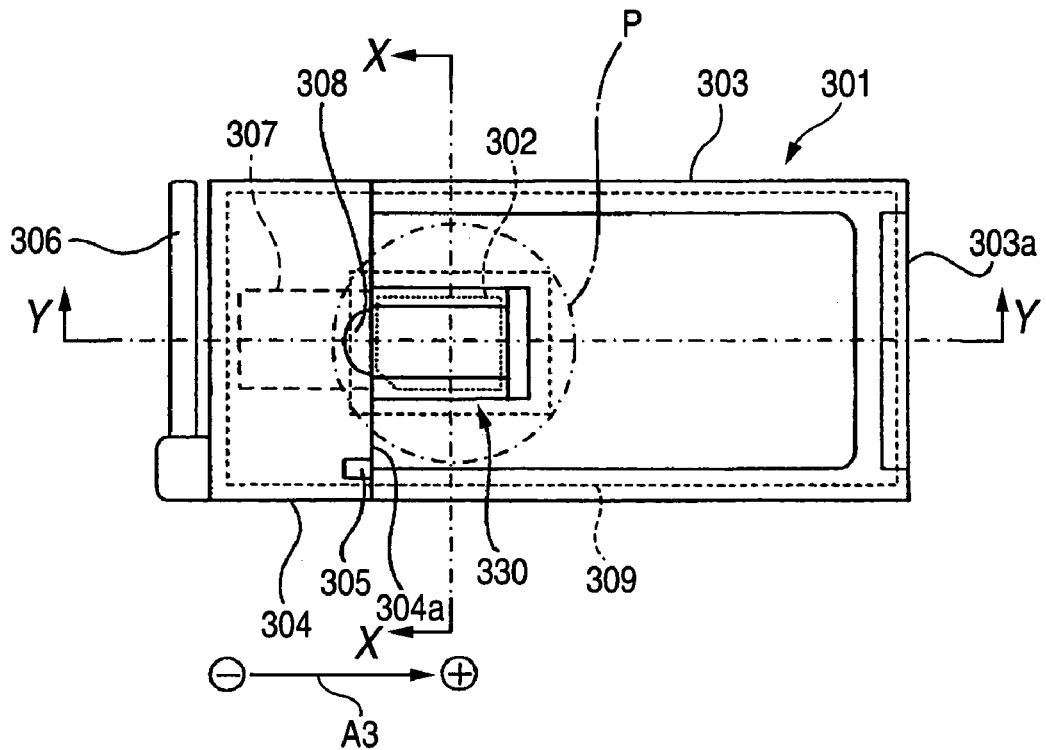
FIG. 11A is a plan view schematically showing the configuration of a PC card of a sixth embodiment.
Figure 11B:
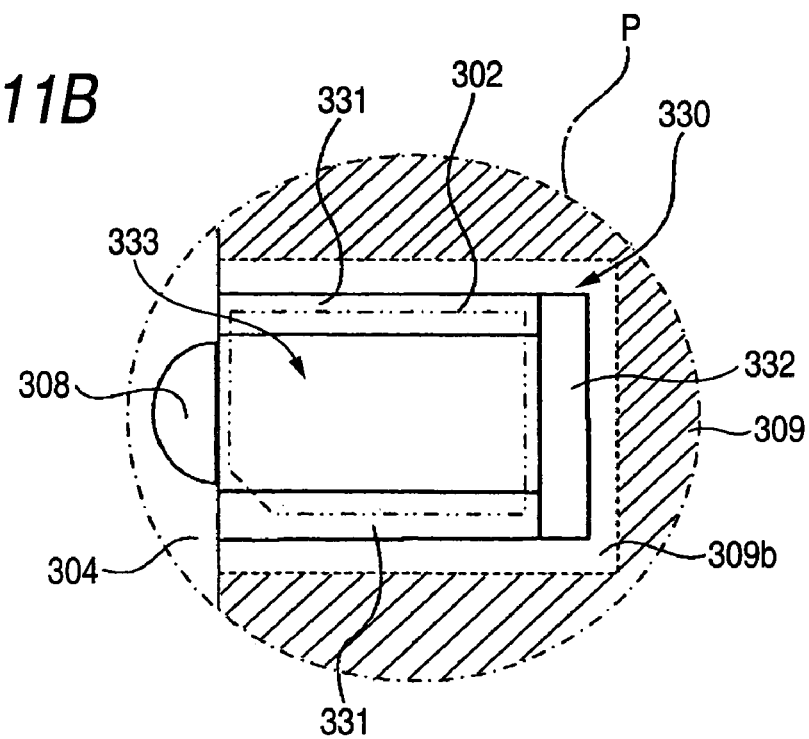
FIG. 11B is an enlarged view of a portion P in FIG. 11A.
Figure 12A:
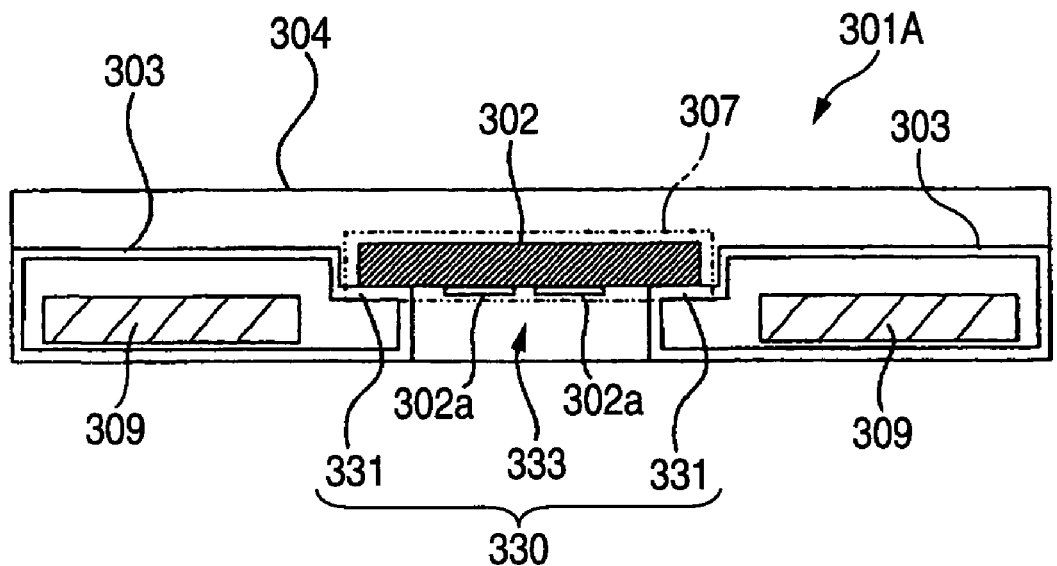
FIG. 12A is a right side section view taken along the line X-X of FIG. 11A.
Figure 12B:
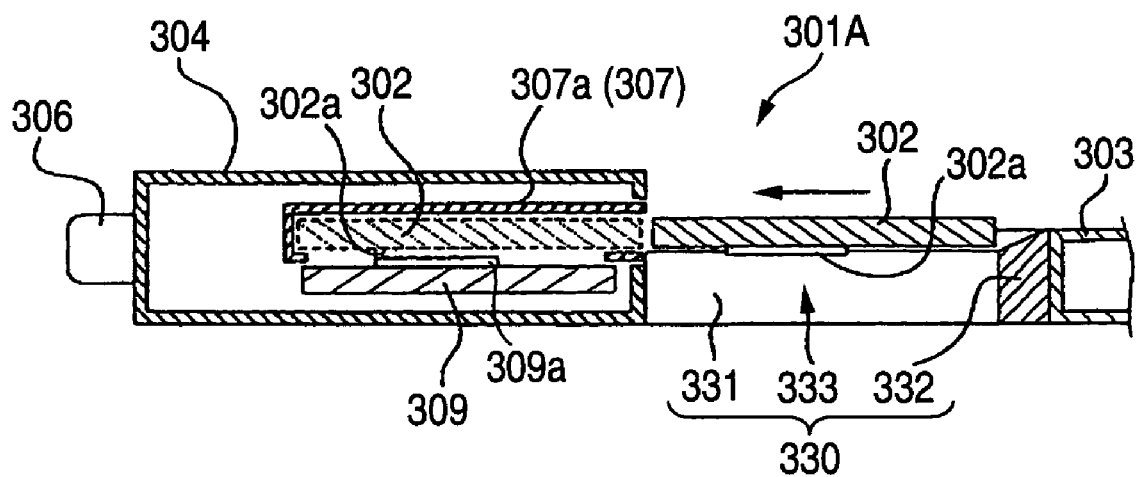
FIG. 12B is a front section view taken along the line Y-Y of FIG. 11A.

FIG. 11A is a plan view schematically showing the configuration of a PC card of the sixth embodiment, FIG. 11B is an enlarged view of a portion P in FIG. 11A, FIG. 12A is a right side section view taken along the line X-X of FIG. 11A, and FIG. 12B is a front section view taken along the line Y-Y of FIG. 11A.

As shown in FIG. 11A, the PC card 301A of the sixth embodiment is different mainly from the fifth embodiment in that a slide recess portion 330 is disposed in the card body portion 303, and, correspondingly, in the configurations of the card extending portion 304, etc. Hereinafter, these points will be described in detail, and, with the other configuration, the same reference numerals as those of the fifth embodiment are used and their description is omitted.

As shown in FIGS. 11A and 11B or FIGS. 12A and 12B, in the sixth embodiment, the slide recess portion 330 is disposed in the card body portion 303. The slide recess portion 330 is used for guiding the SIM card 302 to the chip slot 307 of the card extending portion 304, occupies a region which is slightly larger than the external shape of the SIM card 302, and which extends over an area from an interface portion (a portion of the reference opposing face 304a) between the card extending portion 304 and the card body portion 303 to the card terminal portion 303a, and placed so that the SIM card 302 is embedded in the card body portion 303.

The slide recess portion 330 has a rectangular through hole 333 which is disposed in the card body portion 303, and has a pair of side slide portions 331, 331 which are disposed on the both sides of the through hole 333, and an end slope portion 332 which is disposed on the rear side of the through hole 333 (the side of the card terminals) In the embodiment, "recess" of the slide recess portion 330 includes a case where the surface of the card body portion 303 partially sinks and is bottomed, and that where the card body portion 303 is passed through and not bottomed. The latter case is more advantageous because the guiding position to the insertion port of the chip slot 307 can be adjusted without being affected by the thickness of a member constituting the card body portion 303, and that of the printed circuit board 309.

Each of the side slide portions 331 is formed into a block piece-like shape which stepwise falls from the upper face of the card body portion 303. In order that the side slide portion abuts against a side edge portion of the SIM card 302, the length of the block piece is set to be larger than that of the SIM card 302, and the distance with respect to the other side slide portion 331 is smaller than the width of the SIM card 302.

The thickness (height) of the side slide portion 331 is set so that the upper face of the portion is substantially flush with the upper face of the printed circuit board 309. By contrast, the chip slot 307 is placed so that a guiding face (the upper face of a bottom portion) of the chip case portion 307a is substantially flush with the upper face of the side slide portion 331.

The end slope portion 332 is formed as a slope which is obliquely downward inclined from the upper face of the card body portion 303 toward the upper faces of the side slide portions 331. The end slope portion abuts against the rear end portion of the SIM card 302, and allows the card to slide on the side slide portions 331.

The chip case portion 307a in the embodiment is placed at a position (a position which is closer to the printed circuit board) which is lower than that in the fifth embodiment. Correspondingly, also the thickness (height) of the card extending portion 304 is set to be smaller than that in the fifth embodiment. An escape hole 309b is formed in the printed circuit board 309 by a size which does not interfere with the slide recess portion 330 (see FIGS. 11A and 11B).

In the thus configured embodiment, when the SIM card 302 is to be inserted, the SIM card 302 is dropped into the slide recess portion 330, and then slid toward the card extending portion 304 while being lightly pressed with a finger. The SIM card 302 is then guided by the side slide portions 331 and the end slope portion 332 to slip into the chip slot 307, and, without any further operation, the connecting terminals 302a of the SIM card 302 are placed on the connecting terminals 309a of the printed circuit board 309 to be electrically connected thereto.

In the embodiment, the slide recess portion 330 is disposed in the card body portion 303, and the SIM card 302 is guided into the chip slot 307 by the recess portion. Therefore, the SIM card 302 can be easily inserted without nipping the card with fingers, simply by sliding the card with a finger, and can be safely inserted without producing excessive stress in the SIM card 302.

Particularly, the SIM card 302 is led onto the printed circuit board 309 by the guidance of the side slide portions 331, and placed on the printed circuit board. Therefore, the thickness of the connecting terminals of the printed circuit board 309 can be reduced, and correspondingly also the thickness of the card extending portion 304 can be reduced.

In the embodiment, the rear end portion of the SIM card 302 is exposed by the cutaway portion 308 of the card extending portion 304, and the through hole 333 of the slide recess portion 330 allows the exposed rear end portion of the SIM card 302 to be easily nipped with fingers. Therefore, the SIM card 302 can be extracted easily and safely.

The other configuration and effects of the PC card 301A are identical with those of the fifth embodiment.

Seventh Embodiment

Next, a seventh embodiment of the card for information equipment of the invention will be described with reference to FIGS. 13A to 13C.

Figure 13A:
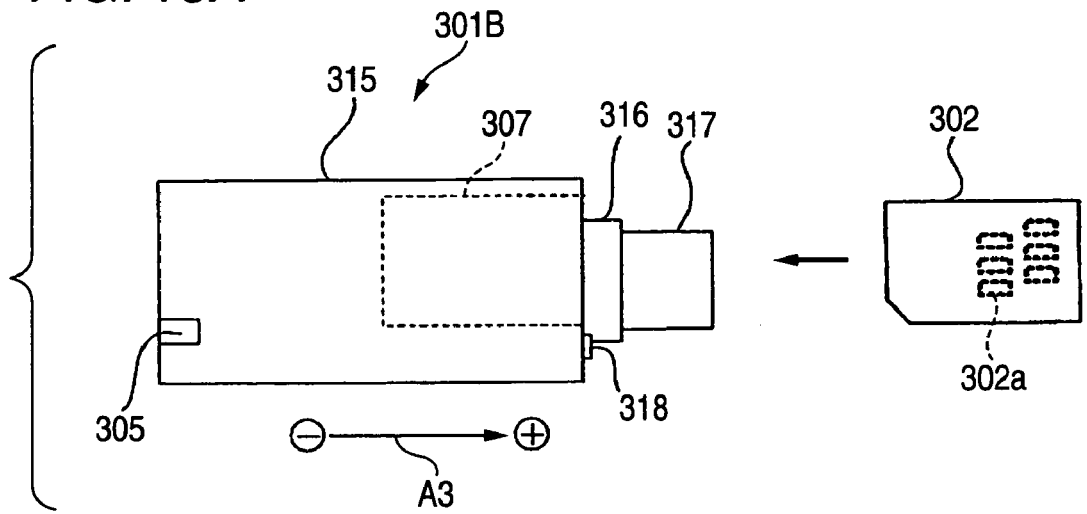
FIG. 13A is a plan view schematically showing the configuration of a USB communication terminal of a seventh embodiment.
Figure 13B:
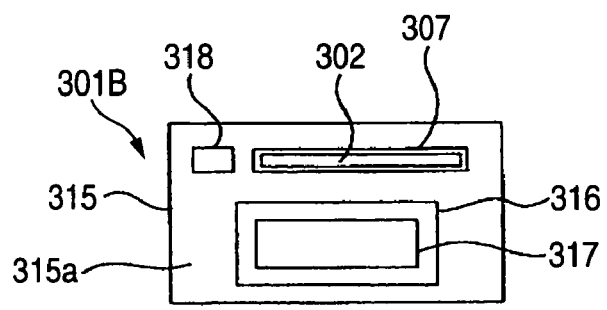
FIG. 13B is a right side view of the USB communication terminal.
Figure 13C:
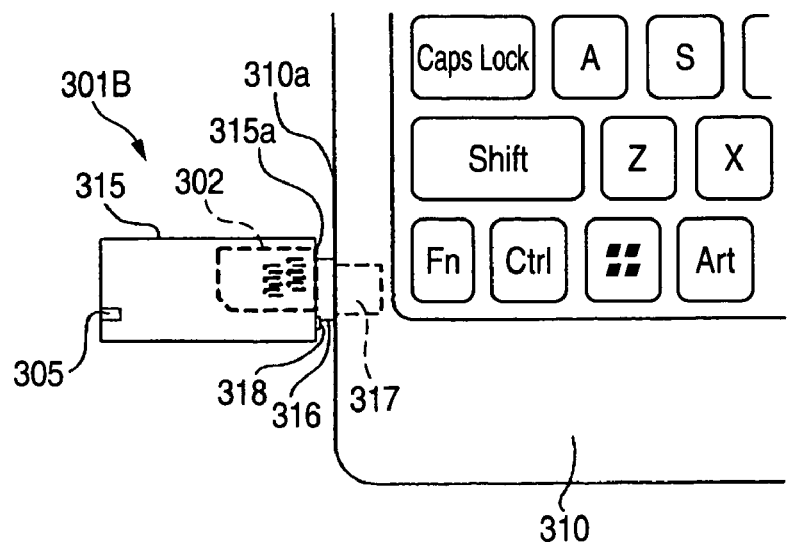
FIG. 13C is a plan view showing a state where the USB communication terminal is inserted to a PC.

FIG. 13A is a plan view schematically showing the configuration of a USB communication terminal of the seventh embodiment, FIG. 13B is a right side view of the USB communication terminal, and FIG. 13C is a plan view showing a state where the USB communication terminal is inserted to a PC.

As shown in FIGS. 13A to 13C, the USB communication terminal 301B of the seventh embodiment is a box-like terminal, and has a terminal body portion 315 and a USB plug 317.

In the same manner as the fifth and sixth embodiments, the terminal body portion 315 incorporates a printed circuit board, an internal antenna (these components are not shown), and the like, and the indicator 305 is formed on the outer surface. The USB plug 317 is to be inserted into a USB slot (not shown) of the PC 310 according to the USB (Universal Serial Bus) system, and electrically connected to a USB port which is at an inner position of the slot.

The USB plug 317 is mounted via a step 316 to one side face of the terminal body portion 315. The one side face of the terminal body portion 315 corresponds to "reference opposing face 304a" in the fifth and sixth embodiments, and, in this embodiment, referred to as "reference opposing face 315a." When the USB plug 317 is inserted to the USB slot, the step 316 makes an interval between the reference opposing face 315a of the terminal body portion 315 and the side face 310a of the PC 310 which is flush with the insertion port of the USB slot, as a gap that is as small as a degree at which a finger cannot be inserted.

In the embodiment, the chip slot 307 which is similar to that in the fifth or sixth embodiment is disposed in the reference opposing face 315a of the terminal body portion. An eject button (operation portion) 318 for ejecting the SIM card 302 from the chip slot 307 is disposed on the same plane (the reference opposing face 315a) as the insertion port of the chip slot 307.

The eject button 318 is retractable into the reference opposing face 315a. When the chip case portion 307a (see FIG. 9A) is moved in the insertion direction A3− of the SIM card 302 in accordance with the insertion of the SIM card 302, the eject button 318 is placed with being protruded. By contrast, when the eject button 318 is depressed inside, the chip case portion 307a is moved in the extraction direction A3+ of the SIM card 302 to be protruded from the insertion port of the chip slot.

As described above, in the embodiment, the chip slot 307 is disposed in the terminal body portion 315 to cause the insertion port to be on the reference opposing face 315a, and the SIM card 302 is inserted to the chip slot 307. Even in a box type terminal, in the same manner as the PC cards 301, 301A, the SIM card 302 can be prevented from being extracted from the terminal body portion 315 during a period when the USB plug 317 is inserted to the USB port and the USB communication terminal 301B operates.

In the embodiment, particularly, the eject button 318 is disposed together with the insertion port of the chip slot 307 on the reference opposing face 315a. In the state where the USB plug 317 is inserted to the USB port, therefore, the operator cannot touch the eject button 318. When the USB communication terminal 301B operates, consequently, the ejection of the SIM card 302 can be prevented from occurring.

The other configuration and effects with respect to the principal points of the USB communication terminal 301B are identical with those of the fifth and sixth embodiments.

The invention is not restricted to the fifth to seventh embodiments, and can be variously modified.

In the invention, the cutaway portion in the mouth of the chip slot is disposed in the PC cards of the fifth and sixth embodiments. Alternatively, the cutaway portion may be disposed in the USB communication terminal of the seventh embodiment. The cutaway portion has the function of, in the state where the SIM card (chip card) is inserted, exposing the rear end portion (insertion port side portion) of the SIM card. This function can be divided into a function of facilitating the extraction of the exposed SIM card by nipping the rear end portion, and that of, in the state where the PC card or the like is inserted to the PC while exposing the rear end portion of the SIM card, recognizing whether the SIM card is inserted or not.

In the invention, in order to further improve the former function (extractabiltiy of a SIM card), the eject button (operation portion) is disposed in the USB communication terminal (terminal for an information equipment) of the seventh embodiment, the eject button is protruded when a SIM card is inserted, and the SIM card is ejected by operating the protruded eject button. Such an eject button may be disposed in the PC cards (terminals for an information equipment) of the fifth and sixth embodiments. The invention is not restricted to this. From another viewpoint, in the seventh embodiment, for example, the eject button is protruded from the step in a state where the SIM card is not inserted, and the eject button abuts against the end face the PC (information equipment) when the USB plug is inserted, thereby informing the operator that the SIM card is not inserted. This is applicable also to the fifth and sixth embodiments.

In order to further improve the latter function (recognizability of a SIM card) in the function of partly exposing the SIM card, an upper portion to which the SIM card is inserted (in the fifth and sixth embodiments, a ceiling face portion of the chip case portion, and the corresponding ceiling face portion of the card body portion) is made transparent or translucent.

In the invention, as in the fifth to seventh embodiments, it is preferable that the rear end portion of the SIM card is placed on or inside the reference opposing face. The invention is not restricted to this. The rear end portion of the SIM card may be protruded from the reference opposing face. In this case, there is an advantage that the extractabiltiy and recognizability of a SIM card are further improved. The amount of projection of a SIM card is restricted to a range where the SIM card does not abut against an end face of a PC.

The invention can be applied to a card type terminal such as a PC card, or a box type terminal such as a USB communication terminal. However, the invention is not restricted to this. The invention can be applied to any terminal for information equipment as far as it comprises a connecting portion which is to be electrically connected to information equipment therein, and a box portion which is protruded from a side face of the information equipment in a state where the connecting portion is electrically connected.

Each of the PC cards of the second embodiment to the sixth embodiment and the USB communication terminal of the seventh embodiment has a port similar to the insertion port 107a in the PC card 101 of the first embodiment.

What is claimed is:

1. A card connector for information equipment, comprising:
   a card body portion which is to be inserted into a card slot of the information equipment;
   a card terminal portion which is electrically connected to the information equipment in a state where the card body portion is inserted into the card slot; and
   a chip slot which is provided for receiving a chip card into the card body portion,
   wherein an insertion port of the chip slot is placed in an insertion port of the card slot when the card body portion is inserted into the card slot,
   the card body portion has an operation portion which has a top portion flushed with a top portion of the card body portion, the operation portion which is provided for ejecting a chip card from electrical engagement with the card body portion in the chip slot, and
   the operation portion is placed so as to be completely covered by the card slot when the card body portion is inserted into the information equipment.

2. The card for information equipment according to claim 1,
   wherein the operation portion reciprocally moves in conjunction with the chip slot, in a direction of inserting or extracting the chip card.

\* \* \* \* \*